United States Patent [19]
Betensky et al.

[11] Patent Number: 5,182,592
[45] Date of Patent: Jan. 26, 1993

[54] REAL IMAGE ZOOM VIEWFINDER

[75] Inventors: Ellis I. Betensky, W. Redding, Conn.; Paul L. Ruben, Penfield, N.Y.

[73] Assignee: Eastman Kodak Company, Rochester, N.Y.

[21] Appl. No.: 699,012

[22] Filed: May 13, 1991

[51] Int. Cl.$^5$ .................... G03B 13/14; G03B 13/10; G03B 13/08

[52] U.S. Cl. .................... 354/221; 354/222; 354/225

[58] Field of Search ................ 354/221, 222, 224, 225

[56] References Cited

U.S. PATENT DOCUMENTS

| | | | |
|---|---|---|---|
| 4,545,655 | 10/1985 | Fantone et al. | 350/540 |
| 4,707,103 | 11/1987 | Ikemori et al. | 354/225 X |
| 4,838,668 | 6/1989 | Betensky et al. | 354/222 X |
| 4,887,109 | 12/1989 | Fujita et al. | 354/222 |
| 4,972,216 | 11/1990 | Ueda et al. | 354/225 |
| 5,014,078 | 5/1991 | Kudo et al. | 354/195.1 |
| 5,052,787 | 10/1991 | Sugawara | 354/222 X |

FOREIGN PATENT DOCUMENTS

| | | |
|---|---|---|
| 1116617 | 5/1989 | Japan . |
| 1131510 | 5/1989 | Japan . |
| 1197717 | 8/1989 | Japan . |
| 1233430 | 9/1989 | Japan . |
| 1309020 | 12/1989 | Japan . |

Primary Examiner—Michael L. Gellner
Assistant Examiner—Jae N. Noh
Attorney, Agent, or Firm—Svetlana Z. Short

[57] ABSTRACT

A real image zooming viewfinder comprising three optical units with refracting optical power and an additional moving reflective optical unit. Zooming is accomplished by moving one of the refractive optical units and the additional reflective optical unit. A parallax correction can be achieved by moving laterally a first optical unit with refractive power.

15 Claims, 2 Drawing Sheets

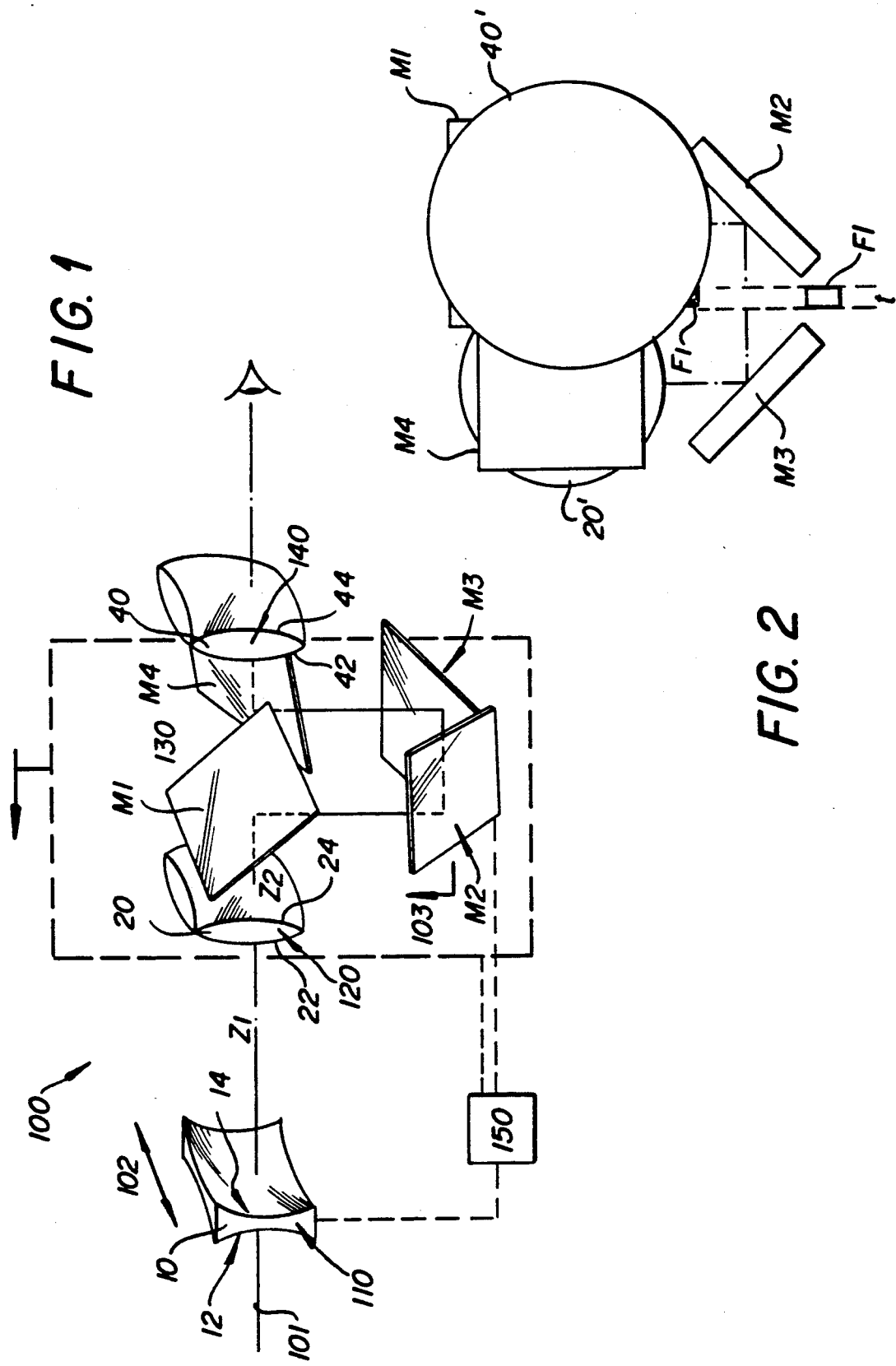

REAL IMAGE ZOOM VIEWFINDER

CROSS-REFERENCE TO RELATED APPLICATIONS

This Application is related to U.S. patent application Ser. No. 699,286, filed May 13, 1991 and entitled OPTICAL SYSTEM WITH IMPROVED FIELD MASK, filed in the names of Betensky et al. and U.S. application Ser. No. 699,284, filed May 13, 1991 and entitled REAL IMAGE VIEWFINDER REQUIRING NO FIELD LENS, filed in the names of Betensky et al.

BACKGROUND OF THE INVENTION

1. Field of the Invention

The invention relates to zoom viewfinder systems. Such systems are useful in photographic cameras.

2. Description Relative to the Prior Art

Cameras using zoom lens systems are well known. In such cameras viewing of the scene by the operator is facilitated by providing a viewfinding device, i.e., a viewfinder that allows the operator to view the object whose image is being recorded by the camera. In those cameras providing through the lens reflex viewing, the image of the object is viewed immediately prior to exposure by using a mirror which is moved before exposure of the film. Camera cost savings may be realized by eliminating the reflex viewing system. However, a need arises to provide a viewing system separate from the exposing system and to have said viewing system be provided with the ability to continuously vary the angular field of view, popularly referred to as zooming. Heretofore, zoom viewfinders of the Galillean type have been suggested. However, because zoom viewfinders of the Galillean type become increasingly large and complex when designed to the 2:1 and greater variable power range and because they have a poorly delineated field of view, other known systems consisting of a zooming objective as the first portion followed by an eyepiece have been developed. While these other systems can be designed for large variable power ranges, they also can become large and complex because of the need for an erecting means.

SUMMARY OF THE INVENTION

It is, therefore, one object of the invention to provide a compact zoom viewfinder that is relatively inexpensive. These and other objects of the invention, which will become apparent from a reading of this specification, are realized by a zoom viewfinder system that can be comprised of three optical units having as few as three lens elements. Zooming can be performed by moving a single optical unit having a refractive optical power and a single additional reflective optical unit. Therefore, according to the present invention, a zoom viewfinder system has only one moving refractive optical unit and only one moving reflective optical unit. More specifically, a zoom viewfinder system comprises a first fixed negative unit which can be moved for compensating, followed by a second moving positive unit to effect magnification change and form a real image, followed by a moving reflective assembly which includes the means for variable path length, and a fixed positive unit which serves as an eye lens.

In this invention the lens powers are chosen so that the principal rays are nearly parallel at the intermediate image, thus eliminating the need for a field lens. Furthermore, using only one type of optical material, such as acrylic, the lateral color may be corrected for zoom ranges extending to at least 3:1. To further simplify construction, the first lens element can be fixed, and the vertical spacing between the upper and lower portions of the reflective unit can be altered as the variator lens component moves during zooming to provide the compensating motion. This results in a less complex system of three lens elements, one of which is moved for zooming, and a zero power mirror subsystem which is moved for compensating the shift in image location. By moving this mirror subsystem, however, the image location moves axially between the lower reflective components in order to remain fixed at the front focal plane of the eye lens. Therefore, for a fixed field mask to be positioned at the image location, it must be of sufficient finite thickness to enable its edges, which define the field of view, to be in constant sharp focus despite the axial shift of the image between the lower reflective components. That is, the field mask thickness must equal or exceed the total axial shift of the image between the lower reflective components. Otherwise, the complexity of a thin field mask linked to the axial movement of the image between the lower reflective components, is required. A further advantage of the fixed first element is that it may be moved laterally (i.e., side to side) to provide correction for parallax.

BRIEF DESCRIPTION OF THE DRAWINGS

Embodiments of the present invention will now be described, by way of example, with reference to the accompanying drawings, in which:

FIG. 1 is a diagram in perspective of a first embodiment of a zoom viewfinder.

FIG. 2 is a diagram of the rear view of the zoom finder of FIG. 1.

DETAILED DESCRIPTION OF THE PREFERRED EMBODIMENTS

First Illustrative Embodiment

Figure 3:
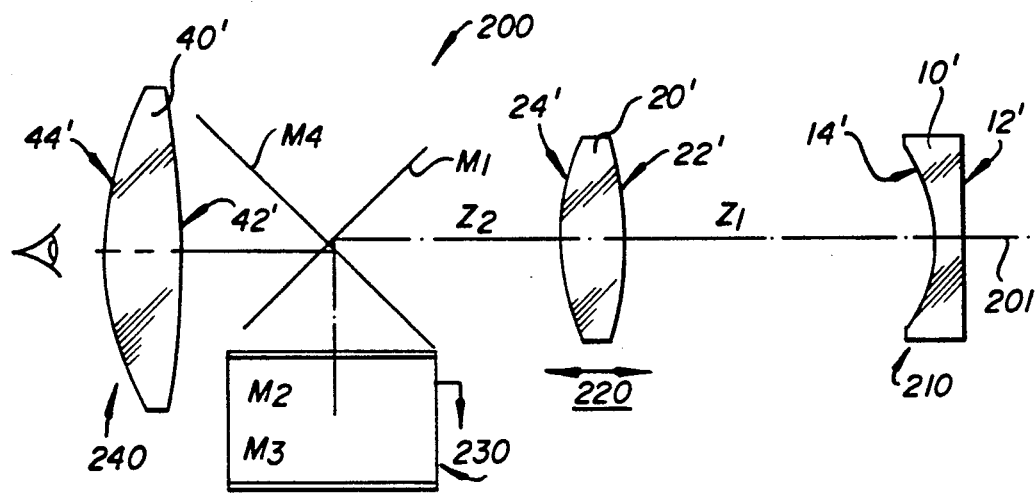
FIG. 3 is a diagram of a second embodiment of a zoom viewfinder.

The viewfinder 100 represented in FIG. 1 is a 2.3× real image zoom viewfinder. The viewfinder 100 has an optical axis 101 and includes four optical units 110, 120, 130 and 140. The optical unit 110 of the first embodiment is stationary and consists of a negative lens component 10. Lens component 10 serves as a negative objective and is fixed, i.e., it is held stationary during zooming. However, it could be made to move along the optical axis 101 to provide further compensation for the image shift during zooming. Lens component 10 is a single biconcave lens element having a front surface 12 and a rear surface 14. Surface 14 has a smaller radius of curvature than surface 12 and thus is more powerful than surface 12. Surface 14 is also aspherical. The specific parameters describing this lens element are given in Table 1.

The second optical unit 120 moves axially back and forth along the optical axis 101 as a variator during zooming and effects a change in magnification. It consists of a positive lens component 20. Lens component 20 is a single biconvex lens element having a front surface 22 and a rear surface 24. Surface 24 is an aspherical surface. The specific surface parameters for the lens element 20 are also given in Table 1.

Figure 4:
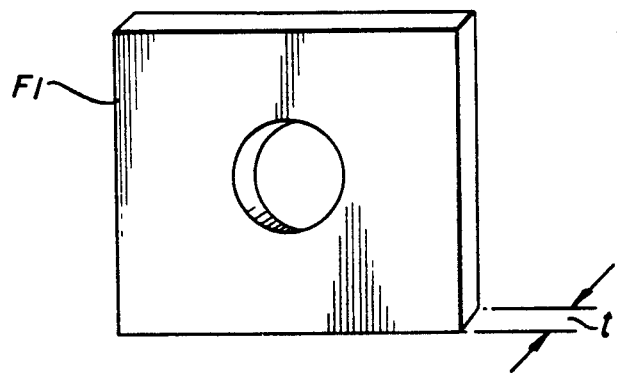
FIG. 4 is a diagram of a field stop/field mask.

The third optical unit is a reflective assembly 130. The reflective mirror assembly 130 consists of 4 mirrors: M1, M2, M3 and M4, arranged in a type-2 Porro prism-like configuration. Mirrors M1, M2, M3 and M4 move axially back and forth along the optical axis 101 at the same rate as the optical unit 120. Thus, mirror assemblies and the second optical unit 120 can be moved together by the gearing mechanism 150. The mirror assembly 130 inverts (erects) and, reverts the image. The magnification of the finder is changed by moving a pair of mirrors M2 and M3 vertically while moving optical unit 120. This may be made using an appropriate gear and cam mechanism 150. The vertical movement of these two mirrors (M2 and M3) in the direction of arrow 103 provides a variable optical path length and thus compensates for the image plane drift introduced or caused by the variator motion, i.e., second unit (120) motion. A real image is formed between the second and third mirrors, shown in FIG. 2 so the field stop F1 or mask may be located there. Because the image plane drifts axially between the two mirrors, the field stop/field mask F1 can be made to move with the image. However, an improved expedient would be to have the field stop be of a thickness that is equivalent to the image plane drift distance, thus, provision of a device for moving the field stop separately is eliminated. In this embodiment the image plane drifts by 1.04 mm; therefore, a field stop F1 thickness, t (FIG. 4), of about 1.1 mm is adequate.

The fourth optical unit 140 which is a rearmost unit, contains a positive lens component 40 and is stationary. Lens component 40 is a biconvex lens element having a front surface 42 and a rear surface 44. Lens component 40 serves as an eye lens and is held stationary, i.e., fixed during zooming.

In addition to the motions of the variator (120) and two mirrors (M2 and M3) required to provide zooming, the front negative lens component 10 may be advantageously displaced laterally, i.e., perpendicularly to the optical axis 101 as indicated by arrows 102, to provide parallax compensation. For a zoom taking lens to viewfinder optical axes separation of 50 mm, to correct parallax from infinity to 0.5 meters, the front element should be displaced 0.71 mm.

Various constructional parameters of the optical system, when in its short focal length conditions, are given in Table 1.

TABLE 1

| | PUPIL OF EYE | | |
|---|---|---|---|
| | RADIUS | THICKNESS | MATERIAL TYPE |
| Lens element 10 | −85.988 | 1.00 | acrylic |
| | 4.933(3) | Z1(1) | |
| Lens element 20 | 13.759 | 2.50 | acrylic |
| | −7.959(4) | Z2(2) | |
| Lens element 40 | 25.240(5) | 3.00 | acrylic |
| | −12.443 | 22.39 | |

NOTES:
(1) (2) Zoom space. Refer to ZOOM DATA TABLE, TABLE 3.
(3) (4) (5) Aspherical surface. Sag Z is defined per following formula:

$$z = \frac{cy^2}{1 + \sqrt{[1 - (1 + k)c^2y^2]}} + Dy^4 + Ey^6 + Fy^8 + Gy^{10} + Hy^{12} + Iy^{14}$$

where 1/C is radius of curvature for the surface, and k is the conic constant of the surface. y is the marginal ray height, and where D, E, F, G, H and I are defined in TABLE 2.

TABLE 2

POLYNOMIAL ASPHERES (COEFFICIENTS OF THE EVEN POWERED TERMS)

| NO. | D (4th) | E (6th) | F (8th) |
|---|---|---|---|
| (3) | 1.3882E − 03 | 1.5508E − 05 | −9.3330E − 06 |
| (4) | 8.6265E − 04 | −1.3786E − 04 | 2.1750E − 05 |
| (5) | −7.1589E − 05 | −3.2260E − 06 | 1.5573E − 08 |

| NO. | G (10th) | H (12th) | I (14th) |
|---|---|---|---|
| (3) | 4.2796E − 07 | 6.9955E − 08 | 5.6732E − 09 |
| (4) | −1.0064E − 06 | −5.6207E − 08 | 4.3911E − 09 |
| (5) | 1.5367E − 09 | 5.6142E − 12 | −8.8297E − 13 |

All dimensions throughout this specification are in millimeters unless otherwise stated.

The spaces between lens component 20 and lens component 30, i.e., air space Z1, as well as airspace Z2 vary during zooming and some values, including those corresponding to magnification at the extremes, are shown in TABLE 3.

TABLE 3

ZOOM DATA TABLE

| MAGNIFICATION | AIR SPACE Z1 | AIR SPACE Z2 |
|---|---|---|
| .351 | 16.500 | 2.626 |
| .390 | 14.851 | 2.391 |
| .430 | 13.476 | 4.173 |
| .470 | 12.333 | 4.957 |
| .486 | 11.929 | 5.270 |
| .510 | 11.372 | 5.738 |
| .550 | 10.548 | 6.522 |
| .590 | 9.840 | 7.301 |
| .630 | 9.218 | 8.085 |
| .670 | 8.672 | 8.867 |
| .710 | 8.187 | 9.649 |
| .752 | 7.767 | 10.624 |

The largest and the smallest magnification value corresponding to the first illustrative embodiment are listed in the preceding table and the corresponding zoom ratio is approximately the ratio of those two figures. When distortion of the system is taken into account, the zoom ratio is 2.3.

Second Illustrative Embodiment

The compact viewfinder 200 represented in FIG. 2 is a 2.8× real image zoom viewfinder. The viewfinder may occupy a space 39 mm long, 25 mm wide and 21 mm high. The viewfinder 200 has an optical axis 201 and includes four optical units 210, 220, 230 and 240. The optical unit 210 of the first embodiment is stationary, i.e., does not move along the optical axis for zooming, but may move laterally (i.e., side to side) for parallax correction as discussed above for the first illustrative embodiment, and consists of a negative lens component 10'. Lens component 10' is a single biconcave lens element having a front surface 12' and a rear surface 14'. Surface 14' has a smaller radius of curvature than surface 12' and thus is more powerful than surface 12'. Surface 14' is also aspherical. The specific parameters describing this lens element are given in Table 4.

The second optical unit 220 moves axially during the zooming action to effect a magnification change. The second optical unit 220 consists of a positive lens component 20'. Lens component 20' is a single biconvex lens element having a front surface 22' and a rear surface 24'. Surface 24' is an aspherical surface. The specific surface parameters for this lens element are also given in Table 4.

The third optical unit is a reflective assembly 230. The third optical assembly of the second illustrative embodiment consists of two subunits. The first subunit is comprised of mirrors M1 and M4. The second group subunit is comprised of two mirrors M2 and M3. The magnification of the zoom viewfinder is changed by moving the second optical unit 220 along the optical axis 201 while moving mirrors M2 and M3 vertically at the same time. That is, mirrors M2 and M3 move in an up and down direction in response to moving of the optical unit 220. Since the image plane, located between mirrors M2 and M3, drifts axially between the mirrors by about 5.6 mm, a field stop thickness should be 5.6 mm or larger.

The fourth optical unit 240 which is rearmost contains a positive lens component 40' and is stationary. Lens component 40' is a biconvex lens element having a front surface 42' and a rear surface 44'. Surface 44' is an aspherical surface.

Various constructional parameters of the optical system, when in its short focal length conditions, are given in Table 4.

TABLE 4

|  | RADIUS | THICKNESS | MATERIAL TYPE |
|---|---|---|---|
| Lens element 10' | −24.1866 | 1.00 | acrylic |
|  | 14.2806(3) | Z1(1) |  |
| Lens element 20' | 11.6342 | 2.70 | acrylic |
|  | −13.2610(4) | Z2(2) |  |
| Lens element 40' | 92.0099 | 3.10 | acrylic |
|  | −10.7746(5) | 22.24 |  |

(1) (2) Zoom space. Refer to ZOOM DATA TABLE.
(3) (4) (5) Aspherical surface. Sag is defined per following formula:

$$z = \frac{cy^2}{1 + \sqrt{[1 - (1 + k)c^2 y^2]}} + Dy^4 + Ey^6 + Fy^8 + Gy^{10} + Hy^{12} + Iy^{14}$$

where 1/C is radius of curvature for the surface, and K is the conic constant of the surface.

TABLE 5

| POLYNOMIAL ASPHERES (COEFFICIENTS OF THE EVEN POWERED TERMS) | | | |
|---|---|---|---|
| NO. | D (4th) | E (6th) | F (8th) |
| 3 | −6.6976E − 04 | 3.0536E − 05 | −2.0633E − 06 |
| 4 | 6.9506E − 05 | −2.2428E − 05 | 2.6700E − 06 |
| 5 | −7.7865E − 06 | 1.4656E − 06 | −6.9094E − 08 |
| NO. | G (10th) | H (12th) | I (14th) |
| 3 | 3.1544E − 08 | 2.6902E − 09 | −7.8763E − 11 |
| 4 | −6.5908E − 08 | −2.5406E − 09 | 9.6469E − 11 |
| 5 | −1.2694E − 10 | 3.3673E − 11 | −2.9428E − 13 |
| CONIC CONSTANTS | | | |
| NO. VALUE | NO. VALUE | NO. VALUE | |
| 2   −5.81581E − 01 | 4   −6.59321E + 00 | 6   −1.28134E + 00 | |

TABLE 6

| ZOOM SPACING DATA | | |
|---|---|---|
| POS | Z1 | Z2 |
| 1 | 24.0833 | 35.5000 |
| 2 | 12.1651 | 39.1547 |
| 3 | 4.6981 | 45.3670 |

In the embodiment described the lens powers are chosen so that the principal rays are nearly parallel at the intermediate image, thus eliminating the need for a field lens. Furthermore, using only one type of optical material, such as acrylic, the lateral color may be corrected for zoom ranges extending to at least 3:1. To further simplify construction, the first lens element can be fixed, and the vertical spacing between the upper and lower portions of the reflective unit can be altered as the variator lens component moves during zooming to provide the compensating motion. This results in a less complex system of three lens elements, one of which is moved for zooming, and a zero power mirror subsystem which is moved for compensating the shift in image location. A further advantage of the fixed first element is that it may be moved laterally (i.e., side to side) to provide correction for parallax.

It should be obvious that weak optical components which do not significantly alter third order aberration corrections or the like might be added, but the term "lens element" or "lens component" is not intended to include such element or component for purposes of the present application.

It should be obvious that prisms can be used as well as mirrors.

For example, in the second illustrative embodiment mirrors M2 and M3 can be substituted by a prism and the design will still fall within the spirit of our invention. The finder may be provided with a delineated central aiming area. Thus, an etched plano plate, colored dot or wire reticle can be located at the real image plane.

The invention has been described in detail with particular reference to several presently preferred embodiment, but it will be understood that variations and modifications can be effected within the spirit and scope of the invention.

There has thus been described a compact zoom viewfinder having relatively fewer parts, only one refracting group movable for zooming and which is relatively inexpensive to build.

We claim:

1. A real image zoom viewfinder system comprising three optical units each having optical power, the system having a minimum of three lens elements each having refractive optical power and one of which optical units is movable along an optical axis of the system and including an additional movable reflective optical unit, wherein zooming is performed by moving only a single optical unit having a refractive optical power and the single additional reflective optical unit.

2. A real image zoom viewfinder system according to claim 1 wherein a first lens element of said three lens elements is moved transversely relative to the optical axis to provide for parallax correction for focusing on close objects.

3. A real image zoom viewfinder according to claim 1, wherein radii of surface aspheric coefficients, the thickness of the elements and the optical materials are as follows:

|  | RADIUS | THICKNESS | MATERIAL TYPE |
|---|---|---|---|
| First lens element | −85.988 | 1.00 | acrylic |
|  | 4.933 (3) | varies |  |
| Second lens element | 13.759 | 2.50 | acrylic |
|  | −7.959 (4) | varies |  |
|  |  | 30.18 |  |
| third lens element | 25.240 (5) | 3.00 | acrylic |
|  | −12.443 | 22.39 |  |

POLYNOMIAL ASPHERES (COEFFICIENTS OF THE EVEN POWERED TERMS)

-continued

| NO. | D (4th) | E (6th) | F (8th) |
|---|---|---|---|
| (3) | 1.3882E − 03 | 1.5508E − 05 | −9.3330E − 06 |
| (4) | 8.6265E − 04 | −1.3786E − 04 | 2.1750E − 05 |
| (5) | −7.1589E − 05 | −3.2260E − 06 | 1.5573E − 08 |

| NO. | G (10th) | H (12th) | I (14th) |
|---|---|---|---|
| (3) | 4.2796E − 07 | 6.9955E − 08 | 5.6732E − 09 |
| (4) | −1.0064E − 06 | −5.6207E − 08 | 4.3911E − 09 |
| (5) | 1.5367E − 09 | 5.6142E − 12 | −8.8297E − 13 |

4. A real image zoom viewfinder according to claim 1, wherein radii of surface aspheric coefficients, the thickness of the elements and the optical materials are as follows:

TABLE 4

|  | RADIUS | THICKNESS | MATERIAL TYPE |
|---|---|---|---|
| Lens element 10' | −24.1866 | 1.00 | acrylic |
|  | 14.2806(3) | varies |  |
| Lens element 20' | 11.6342 | 2.70 | acrylic |
|  | −13.2610(4) | varies |  |
| Lens element 40' | 92.0099 | 3.10 | acrylic |
|  | −10.7746(5) | 22.24 |  |

(1) (2) Zoom space. Refer to ZOOM DATA TABLE.
(3) (4) (5) Aspherical surface. Sag is defined per following formula:

$$z = \frac{cy^2}{1 + \sqrt{[1 - (1 + k)c^2 y^2]}} + Dy^4 + Ey^6 + Fy^8 + Gy^{10} + Hy^{12} + Iy^{14}$$

where 1/C is radius of curvature for the surface, and K is the conic constant of the surface

TABLE 5

| POLYNOMIAL ASPHERES (COEFFICIENTS OF THE EVEN POWERED TERMS) | | | |
|---|---|---|---|
| NO. | D (4th) | E (6th) | F (8th) |
| 3 | −6.6976E − 04 | 3.0536E − 05 | −2.0633E − 06 |
| 4 | 6.9506E − 05 | −2.2428E − 05 | 2.6700E − 06 |
| 5 | −7.7865E − 06 | 1.4656E − 06 | −6.9094E − 08 |
| NO. | G (10th) | H (12th) | I (14th) |
| 3 | 3.1544E − 08 | 2.6902E − 09 | −7.8763E − 11 |
| 4 | −6.5908E − 08 | −2.5406E − 09 | 9.6469E − 11 |
| 5 | −1.2694E − 10 | 3.3673E − 11 | −2.9428E − 13 |

| CONIC CONSTANTS | | | | | |
|---|---|---|---|---|---|
| NO. | VALUE | NO. | VALUE | NO. | VALUE |
| 2 | −5.81581E − 01 | 4 | −6.59321E + 00 | 6 | −1.28134E + 00 |

5. A real image zoom viewfinder according to claim 1 wherein compensation is provided by the reflective optical unit which moves transverse to the optical axis of the system.

6. A real image zoom viewfinder according to claim 1 wherein compensation is provided by the reflective optical unit which moves generally perpendicular to the optical axis of the system.

7. A real image zoom viewfinder system comprising three optical units each having refractive optical power and a reflective erecting assembly for erecting an image of the object, said optical units being a first negative optical unit, a second positive optical unit which moves to effect a magnification change and to form a real image, and a third positive optical unit used to view said real image, wherein said reflective erecting assembly moves during zooming to provide a variable optical path length and thus compensates for the variable image position caused by the second unit.

8. A real image zoom viewfinder system according to claim 7 wherein the first optical unit is held fixed during zooming.

9. A real image zoom viewfinder system according to claim 7 in which the first lens element is moved transversely to an optical axis of the system to provide for parallax correction for focusing on close objects.

10. A real image zoom viewfinder system according to claim 7 in which all lens elements having refractive power are made from the same material.

11. A real image zoom viewfinder according to claim 7 wherein compensation is provided by said reflective erecting assembly which includes a reflecting unit that moves perpendicular to an optical axis of the system.

12. A real image zoom viewfinder according to claim 7 wherein compensation is provided by said reflective erecting assembly which includes a reflecting unit that moves transversely to an optical axis of the system.

13. A real image zoom viewfinder according to claim 8 further comprising a three-dimensional field mask said mask having a thickness substantially equal to the size of an image drift between optical elements of said erecting assembly.

14. A real image zoom viewfinder system comprised of three optical units each having optical power, the system having only three lens elements with refractive optical power and an additional reflective erecting assembly for erecting an image of the object, said optical units being a first negative optical unit which moves for compensating, a second positive optical unit which moves to effect a magnification change and to form a real image, and a third positive optical unit used to view said real image, wherein said reflective erecting assembly moves during zooming to provide a variable optical path length and thus compensates for the variable image position caused by the second unit.

15. A real image zoom viewfinder according to claim 14 further comprising a three-dimensional field mask, said mask having a thickness substantially equal to the size of the image drift.

* * * * *